United States Patent
Verdillon

(10) Patent No.: US 6,729,658 B2
(45) Date of Patent: May 4, 2004

(54) THREADED TUBULAR ELEMENT FOR FATIGUE RESISTANT THREADED TUBULAR JOINT AND RESULTING THREADED TUBULAR JOINT

(75) Inventor: Lionel Verdillon, Dommartin (FR)

(73) Assignees: Vallourec Mannesmann Oil & Gas France, Aulnoye-Aymeries (FR); Sumitomo Metal Industries. Ltd., Osaka (JP)

( * ) Notice: Subject to any disclaimer, the term of this patent is extended or adjusted under 35 U.S.C. 154(b) by 35 days.

(21) Appl. No.: 09/926,678

(22) PCT Filed: Mar. 26, 2001

(86) PCT No.: PCT/FR01/00911

§ 371 (c)(1),
(2), (4) Date: Mar. 22, 2002

(87) PCT Pub. No.: WO01/75346

PCT Pub. Date: Oct. 11, 2001

(65) Prior Publication Data

US 2002/0113436 A1 Aug. 22, 2002

(30) Foreign Application Priority Data

Mar. 31, 2000 (FR) .............................. 00 04135

(51) Int. Cl.$^7$ ................................................ F16L 25/00
(52) U.S. Cl. ....................... 285/333; 285/334; 285/355; 285/390
(58) Field of Search ................................ 285/333, 334, 285/355, 390

(56) References Cited

U.S. PATENT DOCUMENTS

| | | | |
|---|---|---|---|
| 4,113,290 A | * | 9/1978 | Miida .......................... 285/334 |
| RE30,647 E | * | 6/1981 | Blose ........................ 285/332.2 |
| 4,549,754 A | | 10/1985 | Saunders et al. |
| 4,861,210 A | * | 8/1989 | Frerejacques ................. 411/411 |
| 5,056,611 A | * | 10/1991 | Yousef et al. ................. 175/415 |
| 5,092,635 A | * | 3/1992 | DeLange et al. ............ 285/334 |
| 5,419,595 A | * | 5/1995 | Yamamoto et al. ......... 285/334 |
| 5,931,511 A | | 8/1999 | Buster et al. |
| 6,030,004 A | * | 2/2000 | Schock et al. .............. 285/333 |
| 6,174,000 B1 | * | 1/2001 | Nishi et al. .................. 285/333 |

FOREIGN PATENT DOCUMENTS

WO 99 08034 2/1999

OTHER PUBLICATIONS

U.S. patent application Publication US 2003/0085570 A1, May 8, 2003.*

* cited by examiner

*Primary Examiner*—Lynne H. Browne
*Assistant Examiner*—James M. Hewitt
(74) *Attorney, Agent, or Firm*—Oblon, Spivak, McClelland, Maier & Neustadt, P.C.

(57) ABSTRACT

The threading of a threaded tubular element includes at least one tangential multiple radius junction zone at the thread root, in particular on the load flank side. This zone include a principal arc with a radius where the support circle cuts the flank at a point. The tangent to this circle makes a strictly positive angle with the flank. The secondary arcs have lower radii that effect the tangential junction of the principal arc on one side to the flank and on the other side to the thread root. The radius of the principal are larger than that of the standard circle which passes through and which would alone constitute a tangential junction zone. Such a threaded element provides a threaded tubular connection which incorporates good resistance to both static and cyclic stresses.

15 Claims, 13 Drawing Sheets

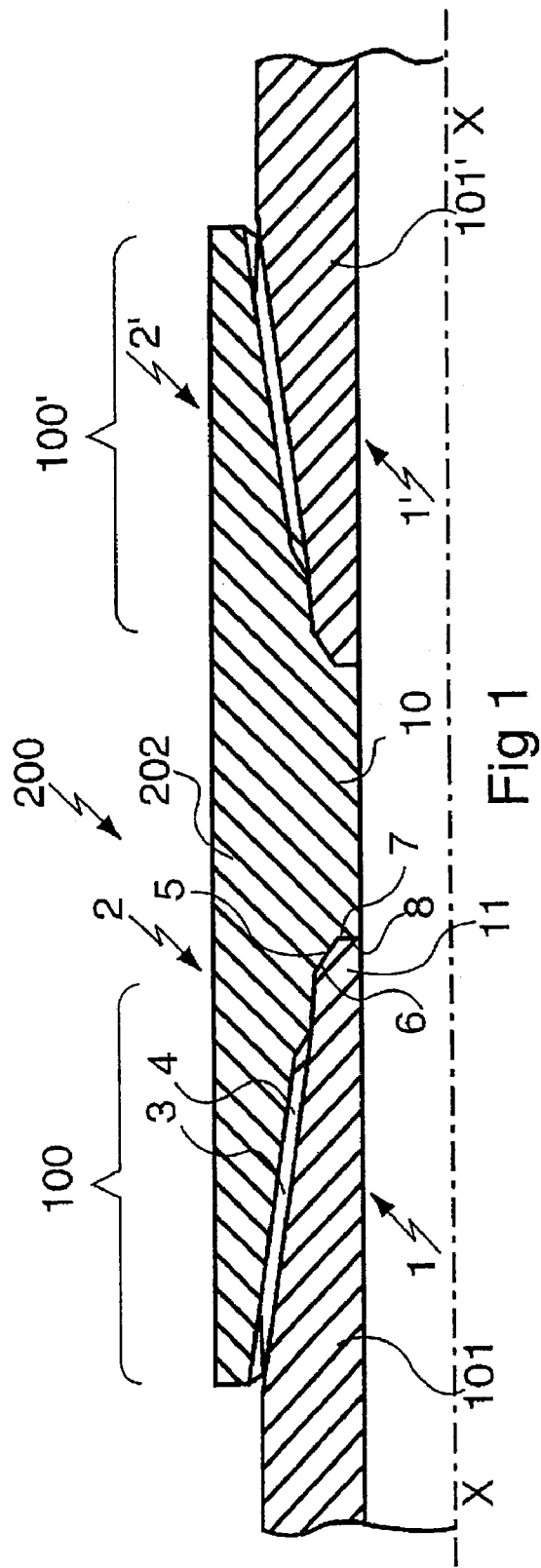
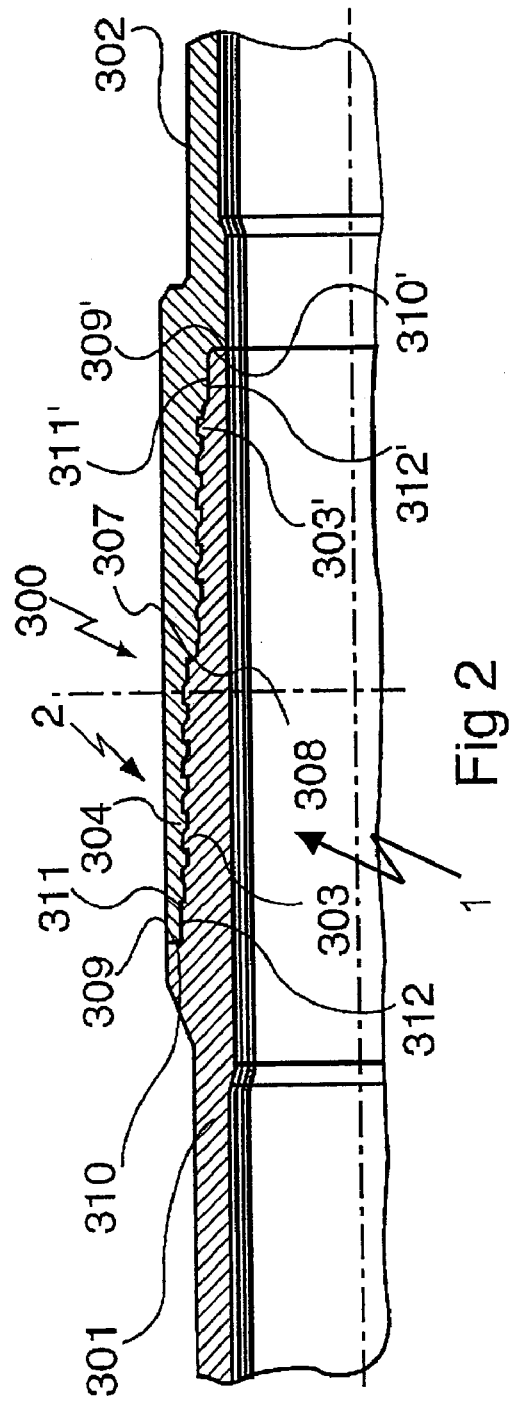

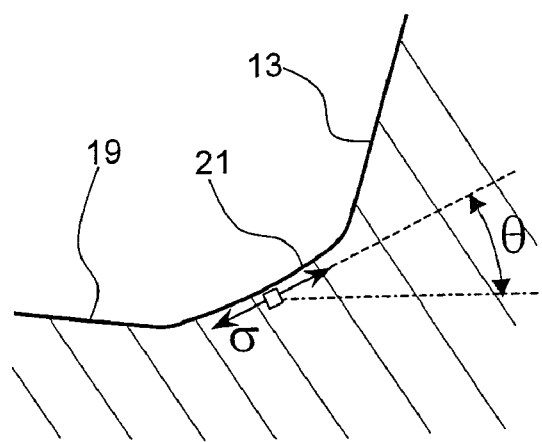
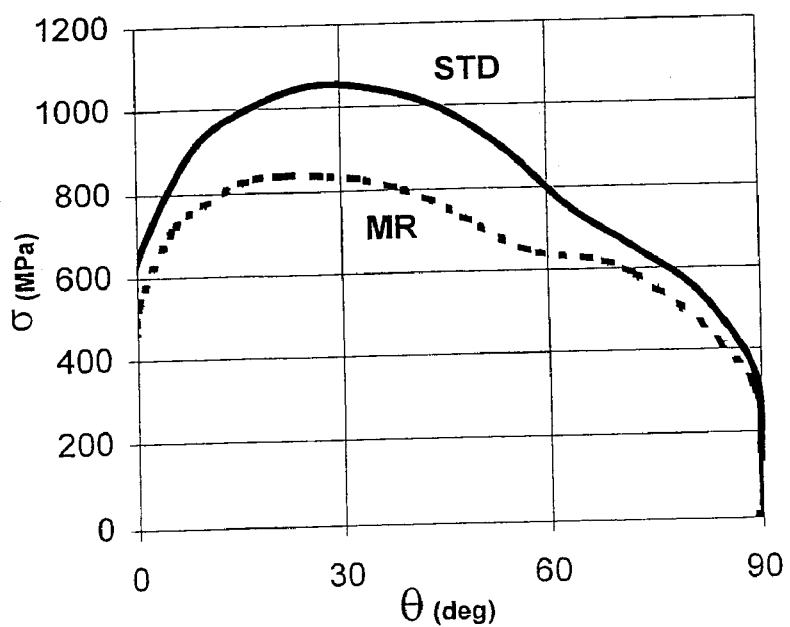
Fig.14

THREADED TUBULAR ELEMENT FOR FATIGUE RESISTANT THREADED TUBULAR JOINT AND RESULTING THREADED TUBULAR JOINT

FIELD OF THE INVENTION

The present invention relates to a male or female threaded tubular element of a threaded tubular connection which is particularly able to resist both static and cyclic stresses.

The present invention also relates to a threaded tubular connection which is particularly suitable for resisting both static and cyclic stresses.

BACKGROUND OF THE INVENTION

Threaded tubular connections comprise a male threaded element at the end of a first pipe and a female threaded element at the end of a second pipe which may be a great length pipe or a coupling. Such threaded connections are used in particular to constitute casing strings or production strings or drillpipe strings for hydrocarbon wells or for similar wells such as for example geothermal wells.

In its API specification 5B, the American Petroleum Institute (API) defines threaded connections between casing pipes or between production pipes in particular with tapered threadings with trapezoidal or round triangular threads.

Other types of threaded connections are also known which use straight or tapered two-step threads: see, for example, U.S. Pat. No. 4,521,042.

Until recently, casing pipes or production pipes had essentially to be capable of resisting different combinations of static stresses (tension, axial compression, plane bending, internal or external pressure) despite their limited thickness resulting from the need to be able to exploit a deep well and insert a variety of columns of different diameters one into another.

In contrast, drillpipes, which are only used to drill wells, are subjected to substantial cyclic stresses but are not subjected to size limitations, since a single string of a given diameter is downhole at a given time.

If not strictly limited, cyclic stresses lead during operation to fatigue ruptures which start at the root of the threads, generally on the side of the load flanks which are under load.

This preferred location for initiation of fatigue cracks results from a stress concentration at the junction between the load flank and the thread root.

To improve the resistance to cyclic stresses, it is necessary to reduce the maximum level of the stresses by reducing the general level of stresses on the load flank and by producing the least possible angularity of the junction between the load flank and the thread root.

API specification 7D defines drillpipes with robust tapered threads which are adapted to operational stresses. API specification 7D threads are triangular in shape and very rounded with load and stabbing flanks which are each disposed at 30° with respect to the normal to the axis of the threaded element.

The load flank is that which is disposed on each thread on the side opposite the free end of the element. This definition will be used throughout the present document.

The thread root is rounded in an arc of a circle with a radius of 0.97 mm (0.038") centred on the axis of the thread root; this arc of a circle joins tangentially with the flanks.

The angle of 60° between the thread flanks resulting from the triangular shape of the threads enables the radius of the arc of a circle to be substantial.

The thread crests are truncated so as to avoid any radial interference between the thread crests and the thread roots of the mated threading.

The height of the truncated threads is 3.08 mm (0.121") which corresponds to twice the height of API 5B threaded connections.

These means can, however, prove to be insufficient since U.S. Pat. No. 4,549,754 describes a threading profile which is modified with respect to API specification 7D for drillpipes which renders it capable of further reducing stress concentration.

The thread of U.S. Pat. No. 4,549,754 shows in cross section a root which is not symmetrical but comprises a rounded zone the centre of which is offset towards the stabbing flank (opposite the load flank) and with the radius increased by about 50% with respect to the API radius, namely 1.45 mm (0.057").

This rounded zone joins the load flank tangentially while it joins with the stabbing flank in a less critical profile: a simple straight segment or a radius of 0.81 mm (0.032") followed by a straight segment.

The thread root is thus more undercut than an API thread and hence requires a large starting pipe thickness in order to cut the threads.

Such a disposition cannot be envisaged for strings of pipes for exploiting wells since these are subjected to both static and dynamic stresses.

Such demands on stress resistance are now being encountered in underwater strings connecting the sea bed to offshore hydrocarbon exploitation platforms.

Such columns of pipes, known to the English-speaking skilled persons as "risers", are subjected to cyclic stresses caused in particular by currents which induce vibrations in the column, by waves, by tides and by possible displacement of the platforms themselves.

Such demands on stress resistance are also encountered in onshore wells, in particular when dropping rotating pipes in order to cement wells in the very frequent case of wells which deviate from the vertical and have bends.

For this reason, improvements to threaded tubular connections for casing pipes, for production pipes or for "risers" have been sought in order to increase their fatigue strength.

Patent application WO 98/50 720 describes such an improved threaded tubular connection.

The threadings described in that document have trapezoidal threads derived from the threads of API specification 5B known as "buttress" threads.

The trapezoidal shape of the threads limits the risk of deformation of the threaded elements which can lead to them dislodging during coupling, in particular by overtorquing.

The thread roots are substantially rectilinear and join to each of the flanks via a rounded zone the radius of which is comprised between 10% and 50% of the total width of the thread root (and preferably between 16% and 26% of that total width), the rounded zone terminating tangentially to the flank and to the thread root.

The thread heights are such that radial interference between the root of one thread and the crest of the corresponding thread of the mated threading is completely avoided by maintaining a radial clearance of at least 0.25 mm (0.010").

Taking into account the threadings given in the example, the radii at the thread root are of the order of 0.5 mm as opposed to 0.15 mm for the radii specified in API 5B.

Such radii may appear low if they are compared with those of drillpipes but the trapezoidal form of the threads used does not allow as large radii to be formed as in the case of triangular threads unless it is acceptable to drastically reduce the bearing surface of the contacting flanks.

The threadings of document WO 98/50720 are also not adapted to interfering type threads which have a radial interference between the thread crests of one threading and the corresponding thread roots of the mated threading. The threads shown are "wedge" type threads with a variable width, like those shown in U.S. Re. Pat. No. 30,647.

SUMMARY OF THE INVENTION

The aim of the present invention is to produce a male or female threaded tubular element for threaded tubular connections, which are particularly resistant both to:

a) static stresses, in particular axial tension, axial compression, bending, torsion, internal or external pressure, dislodging during connection, either simple or combined (for example tension+internal pressure);

b) cyclic stresses.

In the remainder of the present document, such a threaded element will be described as having an anti-fatigue profile.

The present invention also aims to ensure that the threaded tubular element of the invention can be formed with all types of threadings: tapered, straight, straight-tapered combinations, with one or more steps, with trapezoidal or triangular threads, which may be interfering or non-interfering; non interfering threadings are, for example, of the type described in European patent application EP 0 454 147 with simultaneous contact of the two flanks with those of the mated thread (also called "rugged thread"), with an axial interference fit, or of the wedge type with a varying width as described, for example, in U.S. Re. Pat. No. 30,647.

A further aim is that the threaded element can be produced and inspected easily.

The threaded element of the invention must be able to be used to constitute threaded connections for strings of hydrocarbon production pipes, for well casings or for underwater exploitation ("risers") or for similar uses.

A still further aim is to produce threaded tubular connections which are sealed, in particular gas tight, even under cyclic stresses.

In a variation, the threaded element of the invention must be able to be used in drillpipe strings.

A still further aim is to produce a threaded tubular connection in which only one of the threaded elements, for example the female element, has been modified to resist cyclic stresses but which is compatible with a non modified mated threaded element.

In a variation, both threaded elements of the threaded tubular connection have been modified to resist cyclic stresses.

In accordance with the invention, the male or female threaded tubular element with an anti-fatigue profile is formed at the end of a pipe and comprises an external male or internal female threading depending on whether the threaded element is male or female in type.

The threads comprise a thread crest, a thread root, a rectilinear load flank, a rectilinear stabbing flank and two tangential junction zones termed "thread root" zones.

Each of the two tangential thread root junction zones is disposed between the thread root and one of the two thread flanks, termed the "corresponding flank", and comprises an arc of a circle.

At least one of the two tangential thread root junction zones, termed the "multiple radius zone", comprises an arc of a circle termed the "principal arc", wherein the support circle cuts the support straight line of the corresponding flank at a point termed the "flank reference point", and also a regular curve termed the "secondary curve" either side of the principal arc which tangentially joins this to the corresponding flank and to the thread root: a non tangential junction would introduce a stress peak which is particularly deleterious to fatigue at the singular junction point.

Similarly, the second curve must be regular, i.e., must not have a singular point which could introduce a stress peak at this location.

At the flank reference point, the tangent to the support circle of the principal arc makes a strictly positive acute angle with the support straight line of the corresponding flank.

In the remainder of the document, the positive sense is such that the principal arc does not undercut the material of the threads: a negative angle between the tangent and flank would clearly be particularly deleterious for the fatigue behaviour.

Said support circle of the principal arc cuts or is tangential to the support straight line of the thread root and the tangent to said support circle makes, at the point of intersection or at the tangential point under consideration, an angle comprised between −15° and +15° with the support straight line of the thread root.

When the circle support of the principal arc is tangential to the support straight line of the thread root, this angle is zero and the secondary curve on the thread root side reduces to a point.

When the thread root reduces to a point, by convention the support straight line of the thread root is the straight line passing through the thread root which is parallel to the axis of the threaded element.

The shape and disposition of the principal arc in any multiple radius zone is perfectly defined:

by the position of the flank reference point;

by the angle between the tangent to the circle support of the principal arc and the corresponding flank;

and by the angle between the tangent to said circle and the thread root.

The radius of the principal arc of each multiple radius zone of the thread root is larger than that of the arc of the circle termed the "standard arc" passing through said flank reference point which would by itself constitute a tangential junction zone between the corresponding flank and the thread root.

The invention can thus use a high junction radius in the critical zones located towards the middle of the junction zone where the principal arc is located and lower radii at the junction with the corresponding flank and with the thread root where the secondary curves are located, without consuming too much of the thread height.

For a given thread height, the closer the flank reference point to the thread root, the more flank surface is available to bear on the corresponding surface of the mated threaded element, increasing the static performance of the resulting threaded connection.

In the case of prior art threaded elements, the radial height of the junction zone (distance of the flank reference point from the thread root) is proportional to the radius of this zone. As a result, for these threaded elements and for a given thread height, any gain in the fatigue characteristics (cyclic stresses) results in weakening the static characteristics.

In the case of the present invention, because of the positive angle between the tangent to the support circle of the principal arc and the flank, the radial height of the junction zone is proportional to the radius of the principal arc but the coefficient of proportionality is all the more lower as this positive angle increases. Thus either the fatigue behaviour under static conditions is improved or the static conditions for a given fatigue behaviour or the fatigue behaviour and the static characteristics are improved simultaneously.

Preferably, the angle between the tangent to the support circle of the principal arc of the multiple radius zone under consideration and the corresponding flank at the flank reference point is in the range +10° to (70°–J), J designates the corresponding flank angle, i.e., the angle between the rectilinear portion of the flank under consideration and the normal to the axis of the threaded tubular element. The flank angle is said to be positive when the flank under consideration tends not to overhang the thread root.

Highly preferably, the angle between the tangent to the support circle of the principal arc of the multiple radius zone under consideration and the load flank at the flank reference point is in the range +15° to (45°–J), J having the same meaning as above.

A configuration with a positive or zero flank angle is preferable from the point of view of concentrating stresses at the thread roots.

Preferably, the radius of the principal arc of the multiple radius zone is in the range 150% to 250% of that of the standard arc which would constitute a tangential junction zone passing via the flank reference point.

Preferably again, each secondary curve of the multiple radius zone is an arc of a circle.

Highly preferably, the ratio of the radius of the arc of each secondary curve to that of the principal arc is in the range 0.1 to 0.4.

The minimum value of this ratio avoids an excessive increase in stresses at the secondary curves.

The maximum value of this ratio limits the overall extent of the multiple radius zone.

The invention can be applied by modifying the profile of the threads either on the side of a single flank, in particular the load flank which is generally the most loaded, or on the two flanks.

It can also be applied both to triangular and to trapezoidal threads with a fixed or varied width and for tapered, straight, combined, simple or multiple-step threadings.

A variety of embodiments will be described below, in a non-limiting way, which illustrate the scope of the invention.

The invention also provides a threaded tubular connection with a high resistance to static or cyclic stresses, comprising a male threaded tubular element at the end of a first pipe connected by screwing to a female threaded tubular element at the end of a second pipe by means of a male threading on the male threaded tubular element and a female threading on the female threaded tubular element.

The term "pipe" means both a great length pipe and a short pipe such as a coupling.

The threads of each of the threadings comprise a thread crest, a thread root, a rectilinear load flank, a rectilinear stabbing flank and four junction zones each comprising an arc of a circle.

Of these four zones, two zones, termed tangential thread root junction zones, each join the thread root to a flank termed the corresponding flank and two zones, termed thread crest junction zones, each join the thread crest to a flank.

The profile and disposition of each thread crest junction zone are adapted so as not to interfere with the tangential thread root junction zone of the mated threaded element.

At least one of the two threaded elements, male and female, is a threaded tubular element with an anti-fatigue profile of the present invention.

Preferably in a variation, at least one thread crest junction zone of a threaded tubular element opposite a tangential thread root junction zone with multiple radii of a mated threaded tubular element with an anti-fatigue profile is a zone termed a follower which comprises two arcs of a circle which join tangentially to each other namely a principal arc and a secondary arc, this latter producing the tangential thread crest junction to the corresponding flank.

Further, at the point termed the "high junction" of the corresponding flank where the support circle of the principal arc of the following zone cuts the support straight line of the corresponding flank, the tangent to said circle makes a strictly negative acute angle with the support straight line of the flank under consideration.

Under the convention indicated above, such a sign means that the principal arc of the thread crest bites into the material of the thread.

Such a disposition enables the surface area of the flanks in contact to be increased for a given thread height.

In an advantageous variation from the cost viewpoint, only one of the threaded elements, male or female, is of the anti-fatigue type of the invention and is compatible with the other threaded element which is a prior art threaded element.

In an advantageous variation from the viewpoint of maximising performance, the two threaded elements, male and female, are of the anti-fatigue type of the invention.

In a variation, the threaded tubular connection of the invention is applicable to interference type threadings in which the thread crest of one threading radially interferes with the thread root of the mated threading.

In a further variation, the threaded tubular connection of the invention is applicable to threadings in which the two flanks of each thread are in contact, with or without contact pressure, with the two flanks of the mated threading thread, over at least a portion of the length of the threading: the invention is thus applicable to threads known as "rugged threads" with an axial interference fit or with a wedge of varying height.

Other advantages and characteristics of the invention will become clear from the detailed description below and from the accompanying drawings, which not only serve to clarify comprehension of the invention but also contribute to the definition thereof, as appropriate.

BRIEF DESCRIPTION OF THE DRAWINGS

All of the figures described below pertain to longitudinal cross-sections passing through the axis of the element or of the threaded connection.

FIG. 1 shows a threaded and coupled connection between two pipes using tapered threadings.

FIG. 2 shows a threaded connection termed "integral" connection between two pipes using straight, two-step threadings.

FIG. 14 is a graph showing the variation in the principal stress as a function of the angular position on the junction zone between the thread root and the load flank of a threaded tubular connection subjected to the internal pressure of a fluid.

DETAILED DESCRIPTION OF THE INVENTION

Figure 3B:
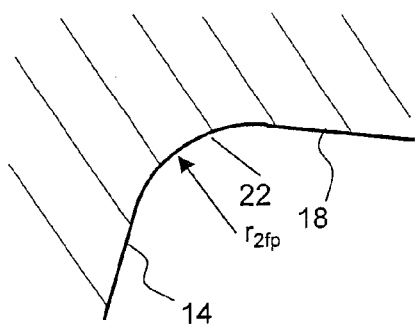
FIGS. 3B, 3C, 3D and 3E show the junction zones between the faces of the threads of FIG. 3A.
Figure 3E:
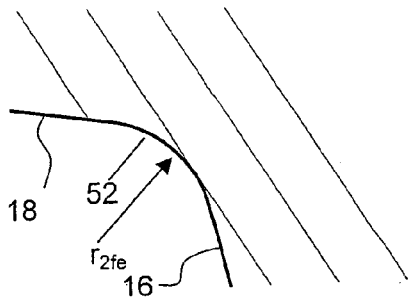

FIG. 1 shows a threaded and coupled connection 200 between two great length pipes 101, 101'.

The term "great length" means pipes several meters in length, for example about 10 m long.

Such pipes are routinely connected to constitute strings of casing pipes or production pipes or "risers" for onshore or offshore hydrocarbon wells or for strings of drillpipes for the same wells.

The pipes can be formed from all types of non alloy steels, light alloy steels or high alloy steels, or from ferrous or non ferrous alloys to adapt them to different operational conditions: the level of mechanical stress or the corrosive nature of the fluid internal or external to the pipes.

It is also possible to use low corrosion resistance pipes provided with a coating, for example of synthetic material preventing any contact between the steel and the corrosive fluid.

Pipes 101, 101' comprise at their ends identical male threaded elements 1, 1' and are connected via a coupling 202 comprising a female threaded element 2, 2' at each end.

Male threaded elements 1, 1' are respectively connected by screwing into the female threaded elements 2, 2' to constitute two symmetrical threaded connections 100, 100' which are joined by a projection 10 a few centimeters long.

The internal diameter of projection 10 of the coupling is substantially identical to that of pipes 101, 101' such that the flow of fluid circulating internally is not perturbed.

Since threaded connections 100, 100' are symmetrical, only one of these connections will be described.

In FIG. 1, the threadings are shown diagrammatically by generatrices or envelopes of the thread crest and thread root.

Male threaded element 1 comprises a male threading 3 in accordance with API specification 5B, tapered as the case may be with triangular or trapezoidal threads and disposed on the outside of the male element. Male threading 3 is separated from the free end 7 of said element by a non-threaded lip 11. The free end 7 is a substantially transverse annular surface.

Adjoining free end 7 on the outer surface of lip 11 is a tapered bearing surface 5 the taper of which is greater than that of male threading 3.

Female element 2 comprises means which mate with those of male element 1, i.e., they correspond in shape and are intended to co-operate as regards their position with the male means.

Female element 2 thus comprises an internal tapered female threading 4 and a non threaded portion between the threading and a projection 10.

This non threaded portion comprises a substantially transverse annular orientation surface 8 forming a shoulder at the end of the projection and a tapered bearing surface 6 following the shoulder.

Screwing male element 1 into female element 2 makes the connection.

Makeup of the male element into the female element is stopped when the transverse surfaces 7 and 8 abut each other. The bearing surfaces 5, 6 are designed to interfere radially with each other and are thus under metal-metal contact pressure. The bearing surfaces 5, 6 thus constitute sealing surfaces which make the threaded connection tight even under high internal or external fluid pressures.

If a tight seal is not required, projection 10 can be dispensed with, and therefore the transverse abutting surface 8 and the bearing surfaces 5, 6.

In a variation, two great length pipes can be screw connected directly as shown in FIG. 2; this type of connection 300, which uses only a single threaded connection, is termed integral.

One end of pipe 301 is provided with a male threaded element 1; the second pipe 302 is provided with a female threaded element 2 at the corresponding end.

Male threaded element 1 comprises an external male threading constituted in the present case by two straight steps or windings 303, 303' with round triangular or trapezoidal threads separated by a transverse annular shoulder 307, the winding with the lower diameter 303' being disposed at the free end 309' of the element; the free end 309' being a transverse annular surface.

A tapered bearing surface 311' is located on the outside surface between the threaded portion 303' and the end surface 309'.

On the opposite side on the male element, the threaded portion 303 is extended by a non threaded portion comprising a tapered bearing surface 311 and a transverse annular surface 309 forming a shoulder.

The female threaded element 2 comprises internal female means which mate with the male means.

Thus the female element 2 comprises a female threading constituted by two straight windings 304, 304' separated by a transverse annular shoulder 308, the winding with the largest diameter 304 being disposed towards the transverse annular free end 310 of the female element.

The female element also comprises two tapered bearing surfaces 312, 312' corresponding to the male bearing surfaces 311, 311' and a transverse annular surface 310' forming a shoulder at the end of the element opposite to the free end 310.

In its made up state, the male threaded portions 303, 303' are respectively s screwed into the female threaded elements 304, 304' and the central shoulders 307, 308 abut against each other. The transverse end surfaces 309, 309' are in partial contact with those of the shoulders 310, 310' respectively and constitute auxiliary abutments for the principal abutment 307, 308.

The male bearing surfaces 311, 311' respectively radially interfere with the female bearing surfaces 312, 312' and develop high metal-metal contact pressures which can seal the connection against external or internal fluids.

In variations which are not shown, the threaded and coupled connection can have straight threadings and the integral connection can have tapered threadings.

The threadings can also each have two tapered threaded portions with a different taper or can be straight-tapered, and the threaded portions of the same threading may or may not be stepped.

The next figures describe variations of threads of threaded tubular elements for a threaded tubular connection which can resist both static and cyclic stresses.

Figure 3A:
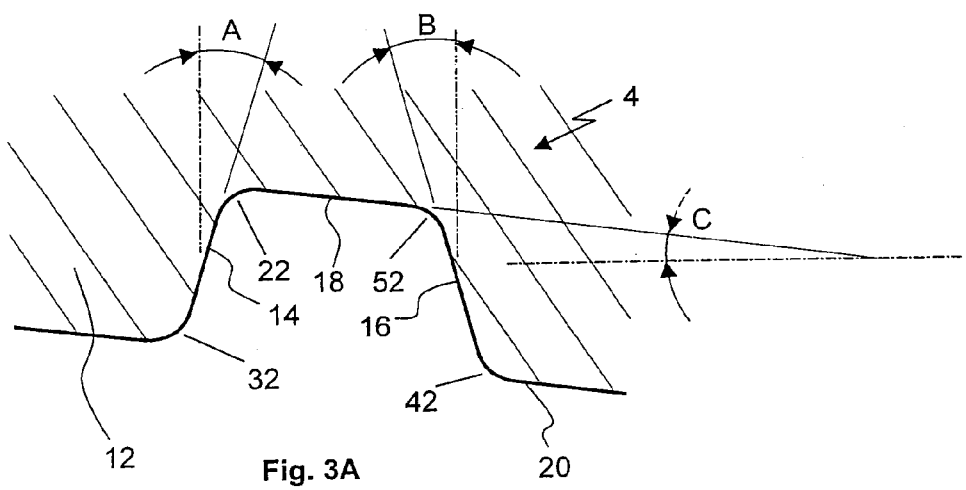
FIG. 3A shows a few trapezoidal threads of a prior art female threaded element.
Figure 3C:
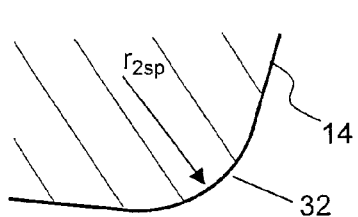
Figure 3D:
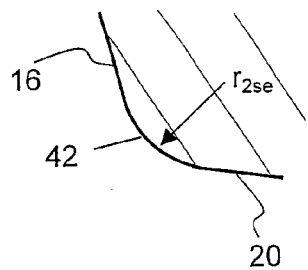

FIG. 3A shows a thread 12 of a tapered female internal threading 4 of a female threaded tubular element 2 of FIG. 1.

Female threads 12 are trapezoidal in shape and comprise four rectilinear faces, namely a thread crest 20, a thread root 18 and two flanks: a load flank 14 and a stabbing flank 16.

In the case shown, the thread crests and roots are inclined at an angle C with respect to the axis of the threaded element: angle C is the taper angle of the threading; the thread height is constant for each flank.

Alternatively, it is possible to have a tapered threading with thread crests and roots which are disposed parallel to the axis of the threaded element: the thread height is then higher on the stabbing flank side than on the load flank side for the threading to be tapered.

Stabbing flank 16 is the flank which comes into contact first with the corresponding flank on the mated threading when the male and female elements are engaged one in the other: it is located on the thread on the side of the free end of the threaded element.

Load flank 14 is thus disposed on the side opposite the free end of the threaded element.

Load flank 14 makes an angle A with the normal to the axis of the threaded element and the stabbing flank makes an angle B with the same normal.

Angles A and B are defined as positive by convention in that the corresponding flanks 14 and 16 do not overhang the thread root 18.

The flanks are joined to the thread crest and root by four tangential junction zones 22, 32, 42, 52 each constituted by a simple arc of a circle as shown in FIGS. 3B, 3C, 3D and 3E.

Zones 22 and 52 with respective radii $r_{2fp}$ and $r_{2fe}$ are tangential thread root junction zones while zones 32 and 42 with radii $r_{2sp}$ and $r_{2se}$ are thread crest junction zones.

The term "tangential" for junction zones 22, 32, 42, 52 means that the arc of the circle from which these zones are constituted is tangential at its ends to the faces it joins. This avoids any angularity which can create a stress peak when these zones are placed under stress.

Figure 4C:
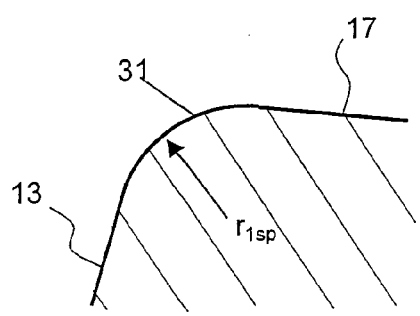
FIGS. 4B, 4C, 4D and 4E show the junction zones between the faces of the threads of FIG. 4A.
Figure 4D:
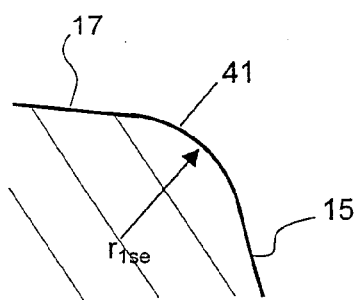
Figure 4A:
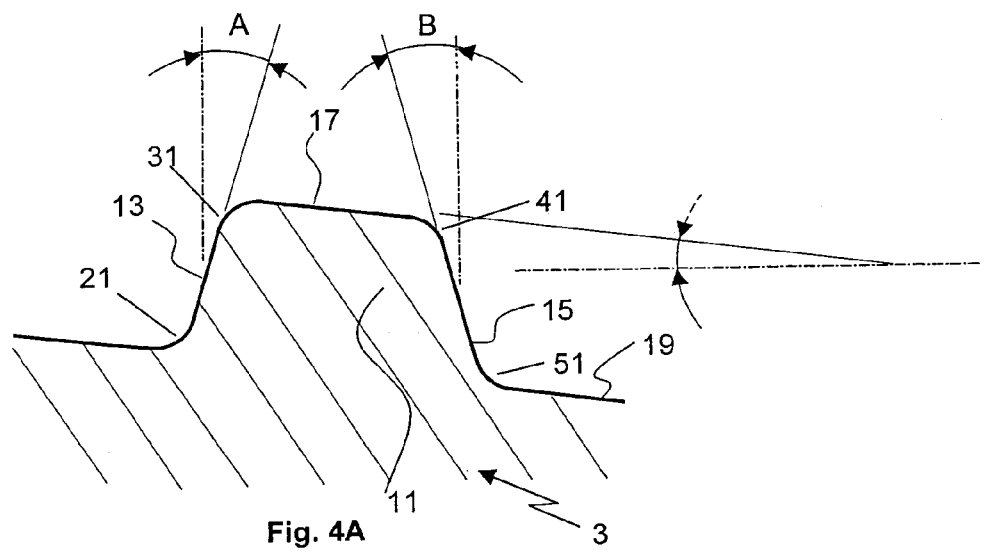
FIG. 4A shows a few trapezoidal threads of a male threaded element of the invention.

FIG. 4A represents a thread 11 of a tapered male external threading 3 of a male threaded tubular element 1 of FIG. 1.

As with female element 12, male thread 11 is trapezoidal in shape and comprises four rectilinear faces, namely a thread crest 17, a thread root 19 and two flanks: a load flank 13 and a stabbing flank 15.

The male threads 11 are adapted to be screwed into female threads 12. The male thread crests and roots are thus inclined at the same angle C as the female thread crests and roots. The angles A of the load flank and B of the stabbing flank of the male thread 11 are identical to those of female thread 12.

The flanks are joined to the thread crest and the thread root via four tangential junction zones 21, 31, 41, 51.

Figure 4B:
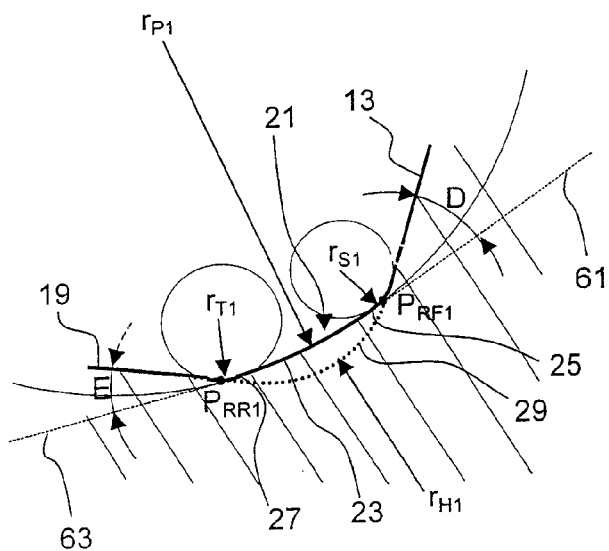
Figure 4E:
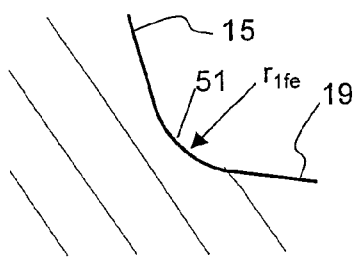

The tangential junction zones for the thread crest 31, 41 and the thread root 51 are constituted by a simple arc of a circle with respective radii $r_{1sp}$, $r_{1se}$ and $r_{1fe}$ and are shown in FIGS. 4C, 4D and 4E.

The tangential thread root junction zone 21 disposed between the thread root and load flank is constituted by several consecutive arcs of a circle with different radii and tangents.

Figure 4F:
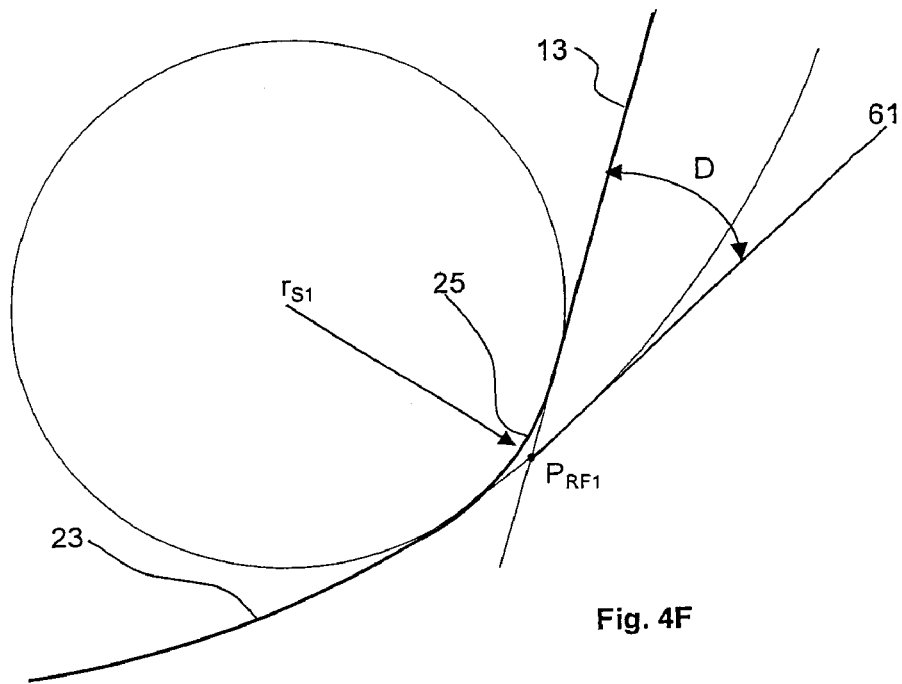
FIGS. 4F and 4G each show a detail of FIG. 4B.
Figure 4G:
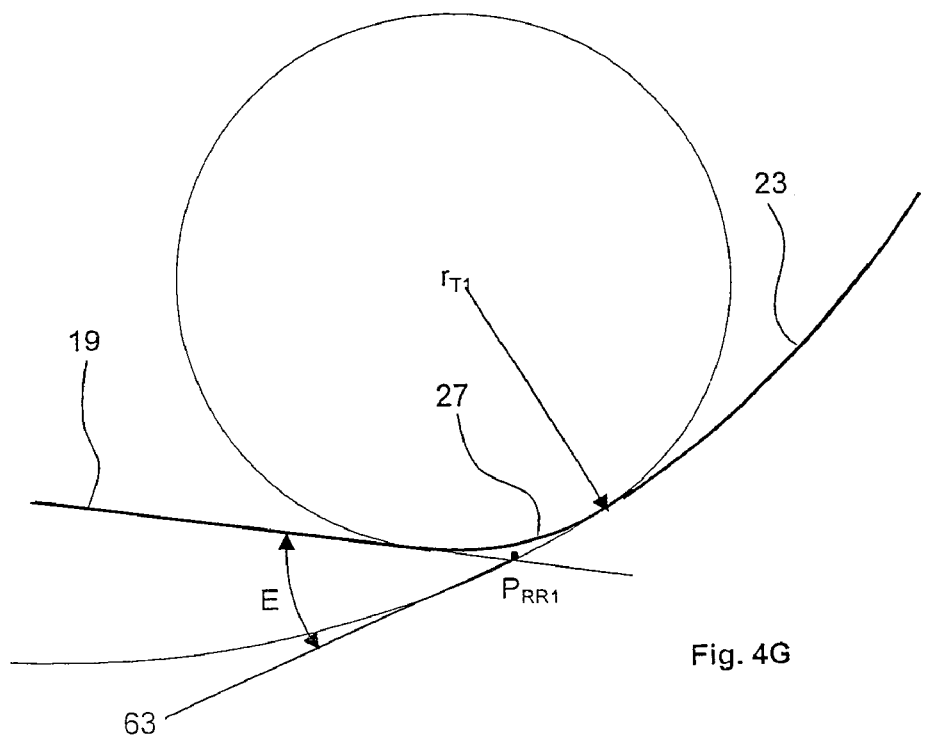

This zone 21 is shown in detail in FIGS. 4B, 4F and 4G and for this reason is termed the "multiple radius zone".

The multiple radius zone 21 comprises a median portion with an arc of a circle termed the "principal arc" 23 with radius $r_{p1}$ and an arc of a circle termed the "secondary arc" on each side of this principal arc, a first secondary arc 25 on the load flank side 13 with radius $r_{s1}$ and tangential to the load flank and a second secondary arc 27 on the thread root side 19 with a radius $r_{T1}$ and tangential to the thread root.

The support circle of the principal arc 23 cuts the support straight line of the load flank 13 at point $P_{RF1}$ termed "flank reference" without being tangential to this support straight line.

Thus there exists at point $P_{RF1}$ an angle D between the tangent 61 to the support circle of the principal arc 23 and the support straight line of the load flank 13. This angle D is strictly positive using the convention we have employed in which such an angle is positive when the principal arc does not cut into the material of the thread; tangent 61 is thus inside thread 11 with respect to the support straight line of the load flank.

The support circle of the principal arc 23 cuts the support straight line of the thread root 19 at point $P_{RR1}$ without being at a tangent to this support straight line.

Tangent 63 to the support circle of the principal arc 23 at point $P_{RR1}$ thus makes an angle E with the support straight line to the thread root 19 which is slightly positive.

The inventors have established that for the threaded connection to function properly, angle E has to be limited to range of +15° to −15°, for example 10°, a negative angle corresponding, using our sign convention, to a principal arc which cuts into the material of the thread or the thread root in the present case.

Fixing the position of point $P_{RF1}$ on load flank 13 and angles D and E can thus perfectly define radius $r_{P1}$ of principal arc 23.

When the taper of the threading is low (angle C being a few degrees) and the load flank 13 is substantially normal to the thread root 19, radius $r_{P1}$ is close to twice radius $r_{H1}$ of the hypothetical circle termed the "standard circle" 29 passing through point $P_{RF1}$ and which would alone constitute a tangential junction zone between the load flank and the thread root. This means that the standard circle 29 passing through $P_{RF1}$ is tangential both to the thread root 19 and to the load flank 13.

The most influential factor on the value of the ratio $(r_{P1}/r_{H1})$ in the permitted variations is the angle D.

When angle D is too low, less than 10°, the ratio $(r_{P1}/r_{H1})$ is barely more than 1 and thus has a limited effect on the fatigue behaviour. As a result, an angle D of more than 10° is selected, preferably more than 15°.

Too large an angle D can cause a geometric incompatibility in the case of threads with very positively inclined load flanks. For this reason the upper limit for D is (70°–A), preferably (45°–A).

Further, too high an angle D in the case of a highly positive angle A causes the values of the ratio $(r_{P1}/r_{H1})$ to be too high which necessitates the use of secondary arcs with a low radius which are the origin of undesirable peaks in operational stress at these arcs 25 and 27.

For this reason, angles D and E are selected with regard to angles A and C such that the ratio $(r_{P1}/r_{H1})$ is in the range 1.5 to 2.5. In the present case, E=10° and D=30°.

The secondary arcs 25, 27 have respective radii $r_{S1}$, $r_{T1}$ which are lower than $r_{P1}$.

This does not affect the operational behaviour of the threadings as the inventors have established that the most stressed portion and thus the most critical portion of the thread root junction zone is the medial portion of the principal arc 23 at the root of the threading on the load flank side.

In threaded couplings subjected to tensile loads of large but varying intensity, fatigue cracks are generally observed to start in the medial portion of the thread root junction zone on the load flank side which supports the tensile loads on the threaded elements.

Too low a radius for the secondary arc can, however, induce a secondary stress peak at the arcs 25 or 27 which can in the second instance initiate operational fatigue cracks.

Too high a secondary arc radius, on the other hand, leads to arcs 25 or 27 where relatively too large a size especially when radius $r_{P1}$ is large.

Preferably, the value $r_{S1}/r_{P1}$ is in the range 0.1 to 0.4.

Figure 5A:
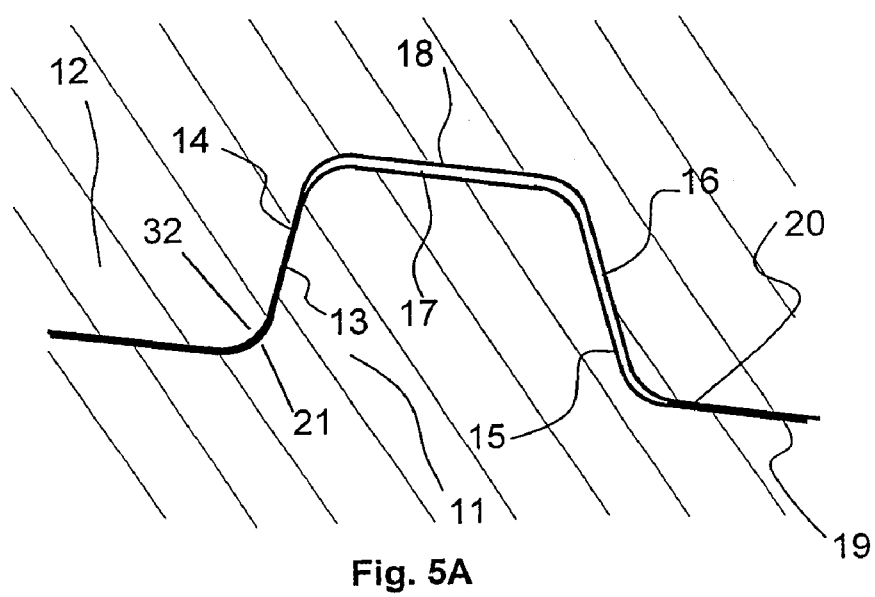
FIG. 5A shows a few trapezoidal threads of a threaded connection of the invention constituted by connecting the threaded elements of FIGS. 3A and 4A.

FIG. 5A shows the male thread 11 of FIG. 4A and the female thread 12 of FIG. 3A once the male and female elements 1, 2 are connected by screwing to constitute a threaded tubular connection of type 100 shown in FIG. 1.

Threads 11, 12 of FIG. 5A are termed interfering as the thread crest 20 of one of the threadings, in this instance the female threading, radially interferes with the thread root 19 of the mated threading, the male thread in this case.

Male and female load flanks 13, 14 are also in contact and are subjected to axial tensile loads, generated by the weight of the pipes in the string and in the case of the threaded connections of FIG. 1 to forces generated by abutment of the transverse surfaces 7, 8 with a makeup torque of several kN.m.

It should be noted that similar tensile loads are obtained when abutting the shoulders 307, 308 of FIG. 2.

Returning to FIG. 5A, a clearance is provided between the male thread crest 17 and the female thread root 18 and between stabbing flanks 15, 16.

These clearances also limit the risks of interference between the male and female junction zones such as 31/22, 41/52 and 51/42, even for identical radii between mated junction zones.

Radius $r_{2sp}$ of junction zone 32 of the female thread crest on the load flank side is selected so as to be sufficiently large so as not to interfere with the multiple radius zone 21.

Any interference between zones 21 and 32 would cause a stress peak and an unacceptable risk of rupture in operation.

The use of a multiple radius zone 21 at the male thread root on the load flank side can increase the radius of the critical portion of the most stressed tangential junction zone if a starting point for the tangential junction zone is fixed on the load flank: see the above analysis of the values of the ratio $r_{P1}/r_{H1}$.

Figure 5B:
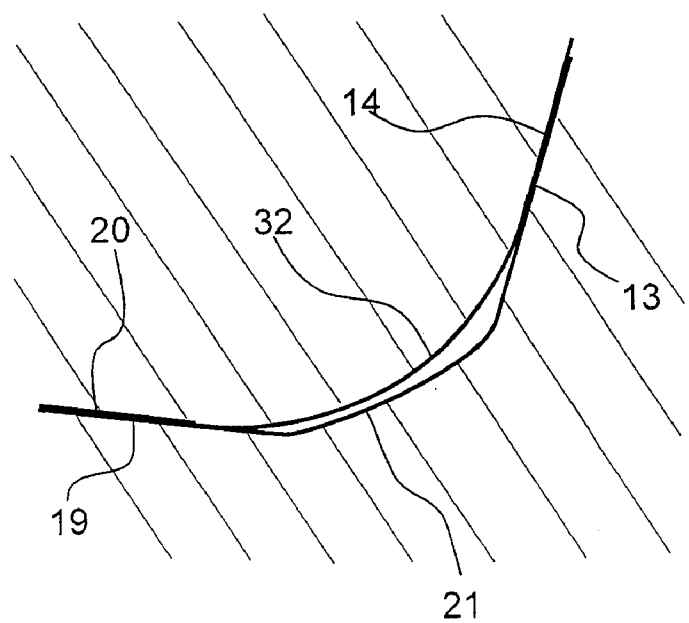
FIG. 5B shows a detail of the connection of FIG. 5A at the junction zones of FIGS. 3C and 4B.

It is also possible to fix a minimum value for the principal arc and analyse the gain in the bearing surface of the thread and thus the static characteristics of the threaded connection. It is true that this gain is partially reduced by using a simple radius $r_{2sp}$ on the mated female junction: see FIG. 5B.

However, it should be noted that taking into account the prior art it is only necessary to modify one single junction zone on one element, in this case the male element.

It is also possible to modify only the female element. It is then possible for the user to employ pipes 101 comprising prior art male threaded elements and to provide only couplings 202 with modified female threads comprising a multiple radius zone between the thread root and load flank.

Finally, it should be emphasised that threads with junction zones with multiple radius zones are not more difficult to machine or inspect than standard prior art threads comprising junction zones with a single radius: machining is carried out using tools with a suitable form and inspection is carried out conventionally by superimposing two gauges machined to the two extremities of the manufacturing tolerances (known as "overlay inspection").

Figure 6B:
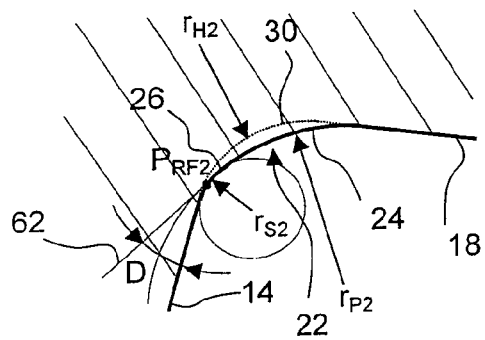
FIGS. 6B, 6C, 6D and 6E show the junction zones between the faces of the threads of FIG. 6A.
Figure 6E:
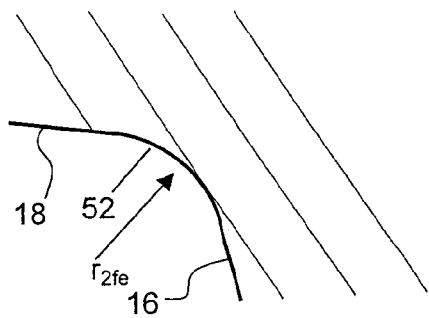
Figure 6A:
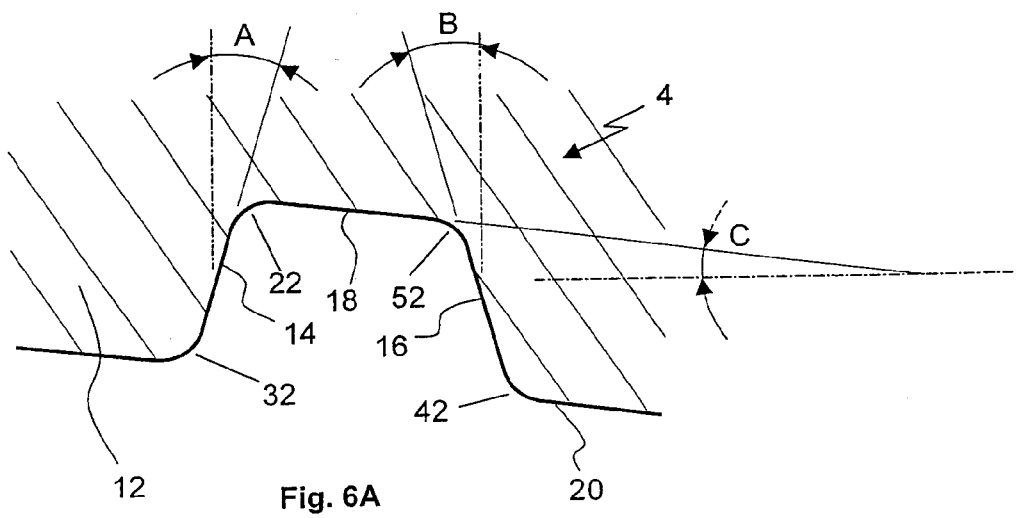
FIG. 6A shows a few trapezoidal threads of a variation of a female threaded element of the invention.

FIG. 6A shows a female thread 12 with a trapezoidal shape globally similar to that of FIG. 3A.

This thread, however, incorporates differences over that of FIG. 3A which concern the two load flank side junction zones, namely zone 22 of the thread root and zone 32 of the thread crest which are both multiple radius zones.

Zone 22 is shown in detail in FIG. 6B.

It comprises a principal arc 24 and a secondary arc 26 tangential on one side to the principal arc and on the other to the load flank 14. The principal arc joins tangentially to the thread root 18 such that it is not necessary to provide a second secondary arc to join at this point.

The principal arc cuts the load flank 14 at point $P_{RF2}$ and the tangent 62 to the support circle of the principal arc 24 at $P_{RF2}$ makes a strictly positive angle D with the support straight line of load flank 14.

The same sign convention as described above is used.

In FIG. 4B, angle D is +30°.

Because of the positive angle D, radius $r_{p2}$ of principal arc 24 is larger than $r_{H2}$ of standard circle 30 alone constituting the tangential junction zone between load flank 14 and thread root 18.

The value of the ratio $r_{p2}/r_{H2}$ satisfies the same considerations as those described for junction 21 of FIG. 4B, the present case constituting a particular case in which angle E is zero.

The secondary arc 26 has a radius $r_{S2}$ which is lower than that of the principal arc for the reasons already described in the case of FIG. 4B.

Figure 6C:
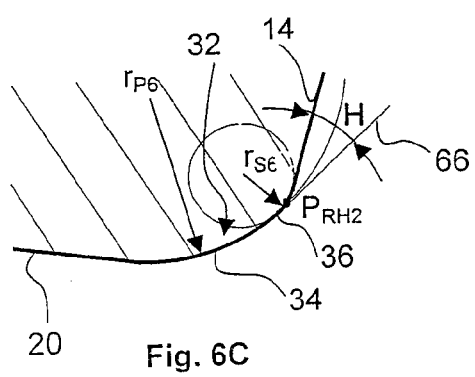

Thread crest junction zone 32 is shown in detail in FIG. 6C.

It comprises a principal arc 34 and a secondary arc 36, the latter being tangential on one side to the principal arc 34 and on the other side to the load flank 14.

The support circle of the principal arc 34 cuts the load flank at a point $P_{RH2}$ termed the "high junction point".

The tangent 66 at $P_{RH2}$ to the principal arc 34 makes an angle H with the load flank 14.

Angle H is strictly negative using our sign convention, i.e. principal arc 34 cuts or bites into the material of thread 12.

Figure 6D:
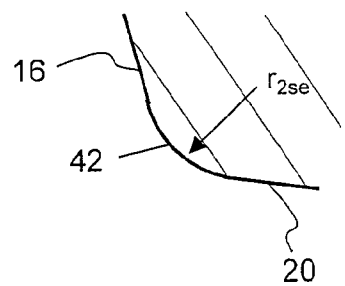

The importance of such a configuration for the junction zone 32 is that with an identical radius it can locate point $P_{RH2}$ closer to the thread crest than in the case of a junction such as 42 (see FIG. 6D) constituted by a simple arc of a circle.

If desired, the junction between the zone 32 and the thread crest can be tangential in a manner not shown in FIG. 6C, via a second secondary arc.

Moreover the radius $r_{P6}$ of the principal arc 34 can be infinite if required, arc 34 then becoming a straight line.

The radius $r_{S6}$ of the secondary arc 36 is always lower than the radius $r_{P6}$ of the principal arc 34. This will be the same for a further secondary arc on the thread crest side.

Figure 7B:
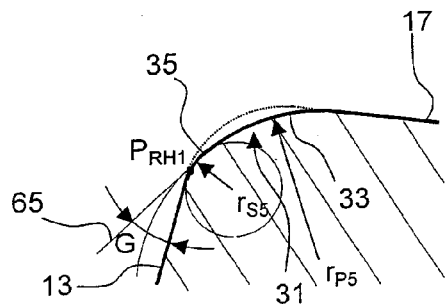
FIGS. 7B, 7C, 7D and 7E show the junction zones between the faces of the threads of FIG. 7A.
Figure 7D:
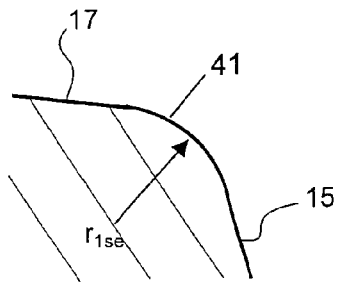
Figure 7A:
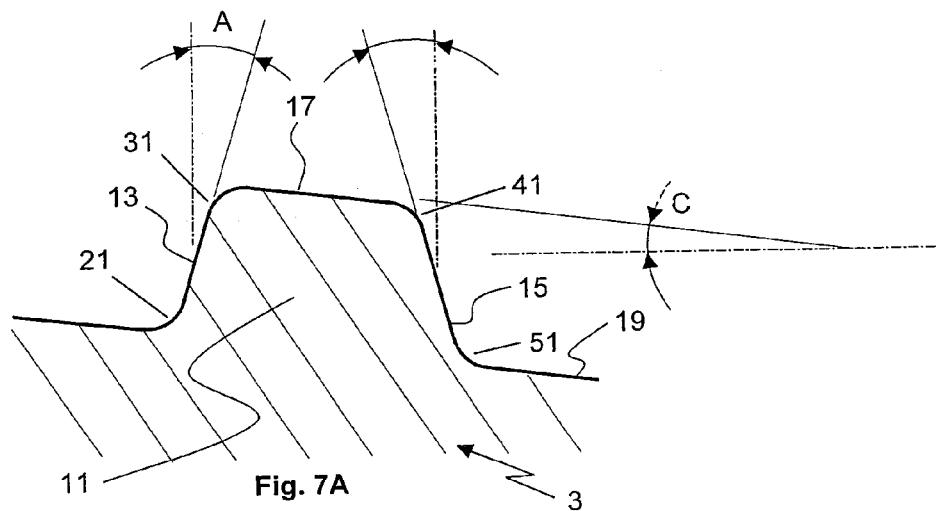
FIG. 7A shows a few trapezoidal threads of a variation of a male threaded element of the invention.

FIG. 7A shows a male thread 11 with a globally trapezoidal shape similar to that of FIG. 4A.

This thread is of a shape adapted for makeup into the female thread 12 of FIG. 6A.

As for FIG. 6A, the junction zones 41, 51 of the stabbing flank side have a simple radius (see FIGS. 6D and 6E) while those of 21 and 31 of the load flank have multiple radii.

Figure 7C:
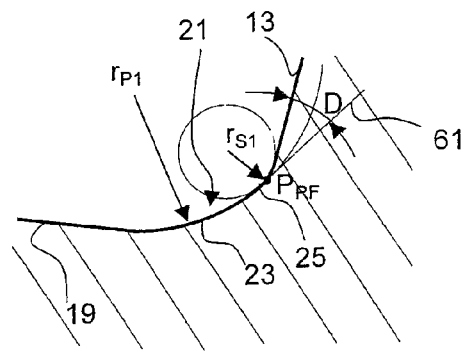
Figure 7E:
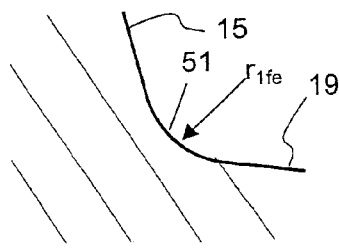

The tangential thread root junction zone (FIG. 7C) is similar to that 21 of FIG. 4A except that angle E is zero, and there is no need for a secondary arc to join the principal arc 23 to the thread root 19: zone 21 thus wholly matches zone 22 of FIG. 6B: in particular, angle D is +30°.

Thread crest junction zone 31 (FIG. 7B) is similar and matches zone 32 of FIG. 6C.

Figure 8B:
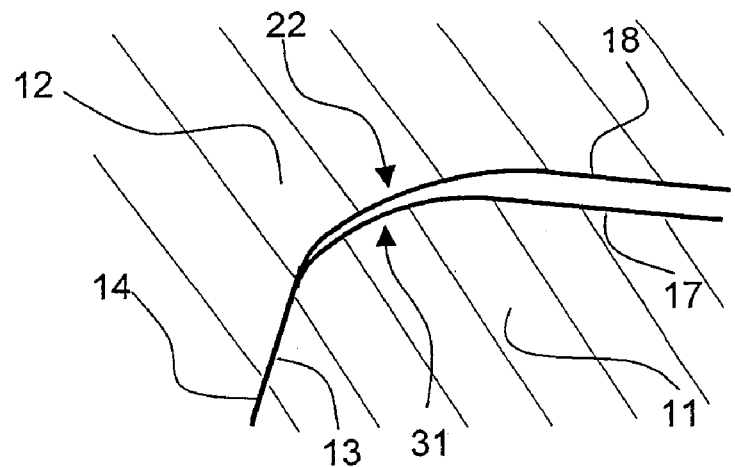
FIG. 8B shows a detail of the connection of FIG. 8A at the junction zones of FIGS. 6C and 7B.
Figure 8A:
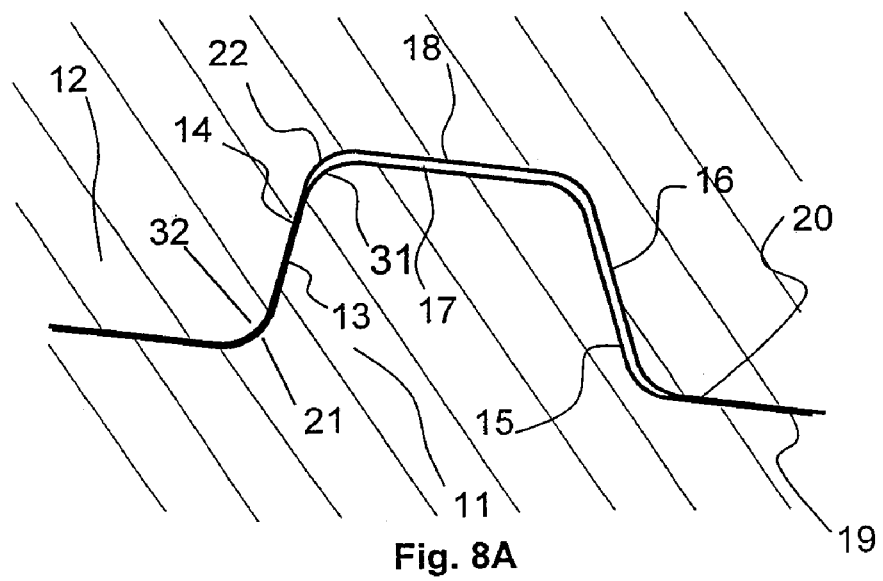
FIG. 8A shows a few trapezoidal threads of a variation of a threaded connection of the invention constituted by connecting the threaded elements of FIGS. 6A and 7A.

FIG. 8A shows the male thread 11 of FIG. 7A and the female thread 12 of FIG. 6A once threaded elements 1, 2 have been connected by screwing to constitute the threaded tubular connection 100 of FIG. 1.

Threads 11, 12 of FIG. 8A are of the interfering type as are those of FIG. 5A: only the female thread crests 20 are in contact under contact pressure with the male thread roots 19, also the male and female load flanks 13, 14.

Figure 8C:
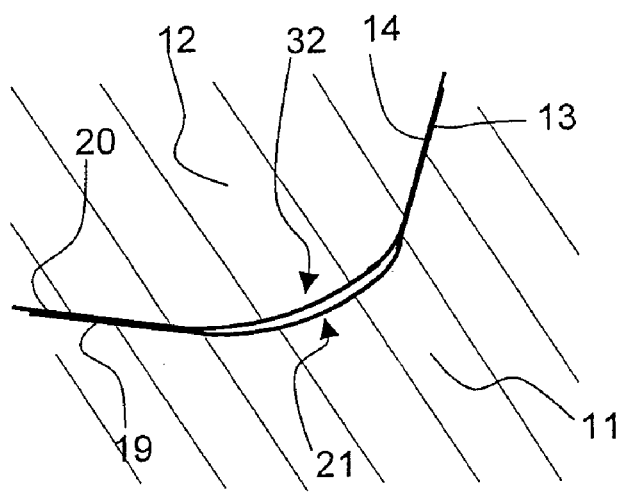
FIG. 8C shows a detail of the connection of FIG. 8A at the junction zones of FIGS. 6B and 7C.

FIGS. 8B and 8C show the relative disposition of the connected multiple radius junction zones 21, 32, 31, 32. Because of the modification of the thread crest junction, the male and female load flanks 13, 14 can bear over a larger surface than in the case of FIG. 5A and can thus support higher static tensile loads.

Further, the male and female threaded elements have been both modified, and the fatigue behaviour of the connection is not limited by the fatigue behaviour of the unmodified threaded element as is the case with FIG. 5A.

In contrast, this type of threaded connection requires the provision of modified male and female anti-fatigue profile type elements.

Figure 9B:
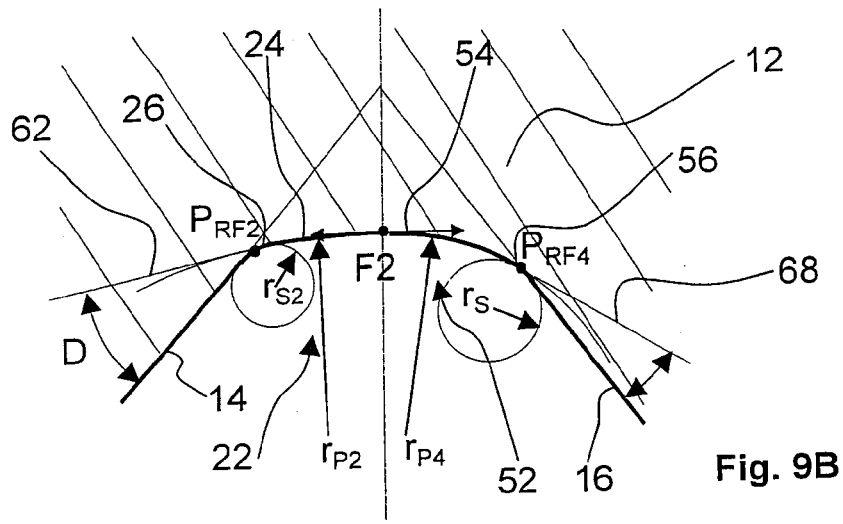
FIGS. 9B and 9C show the junction zones between the thread flanks of FIG. 9A.
Figure 9A:
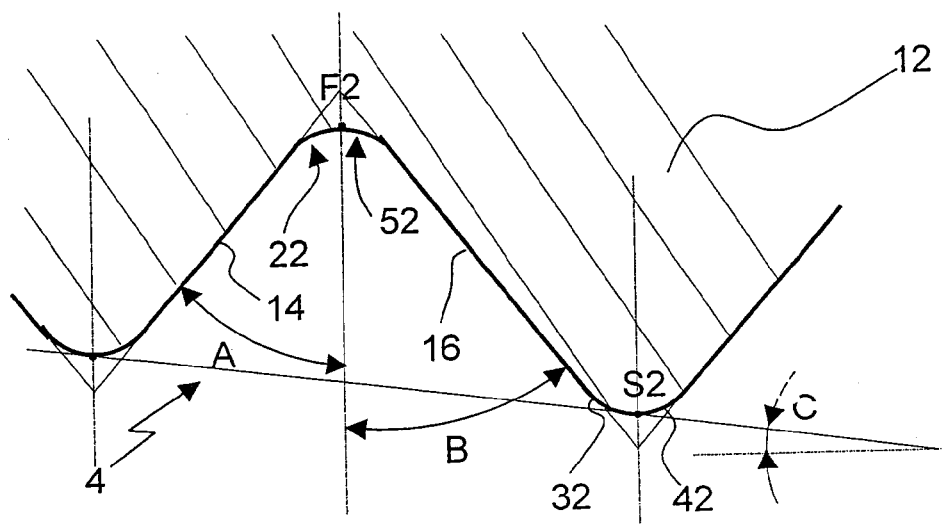
FIG. 9A shows a few triangular threads of a further variation of a female threaded element of the invention.

FIG. 9A shows a female thread 12 with a triangular shape on a female threaded tubular element of FIG. 1.

Female thread 12 comprises:
  a thread crest S2;
  a thread root F2;
  a load flank 14 making an angle A with the normal to the axis to threaded element 2;
  a stabbing flank 16 making an angle B with the normal to the axis of threaded element 2.

The angles A and B are both 30° as in API specification 5B.

The definition of the load flank and of the stabbing flank is the same as that given above.

Since threading 4 is tapered, the line joining the thread crests and that joining the thread roots make an angle C with the axis of the threaded element.

Flanks 14, 16 are joined to crest S2 and to root F2 of the thread by tangential junction zones 22, 32, 42, 52.

Figure 9C:
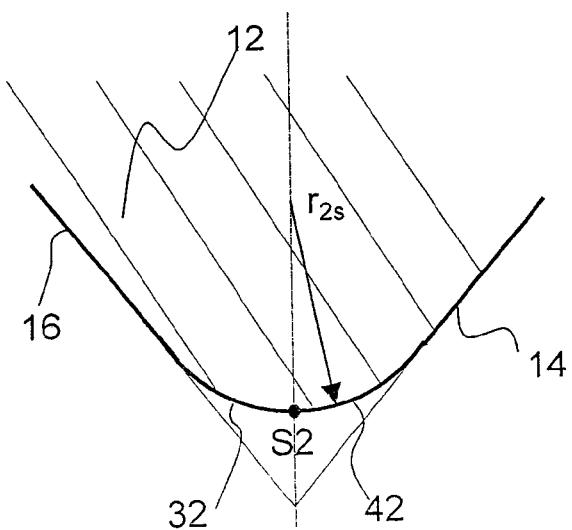

Zones 32, 42 of the thread crest are symmetrical with respect to the normal to the axis of the threaded element passing via crest S2; they are constituted by a simple arc of a circle with radius $r_{2s}$: see FIG. 9C.

Zones 22, 52 of the thread root are not symmetrical with respect to the normal to the axis of the threaded element passing through root F2; they are constituted by multiple radii: see FIG. 9B.

Zone 22 comprises a principal arc 24 with radius $r_{p2}$ which is tangential to F2 at the thread root support straight line. The support circle for the arc 24 cuts the support straight line of load flank 14 at $P_{RF2}$.

Using the convention described above, the support straight line of the thread root in the case of triangular threads is defined as being the straight line parallel to the axis of the connection passing through thread root F2.

At $P_{RF2}$, the tangent 62 of the principal arc 24 makes a positive angle D with load flank 14. Angle D is 30°, for example.

Zone 22 also comprises a secondary arc 26 with radius $r_{s2}$ one end of which is tangential to the end of the principal arc 24 and the other end of which is tangential to the load flank 14.

The radius $r_{p2}$ of the principal arc 24 is thus larger than the radius $r_{H2}$ of a standard circle with a not drawn tangent at $P_{RF2}$ of the load flank and at F2 to the support straight line of the thread root and thus induces the anti-fatigue characteristics at the junction between the thread root and load flank.

The radius $r_{S2}$ is lower than radius $r_{P2}$ and is preferably in the range 0.1 to 0.4 times $r_{p2}$.

Zone 52 comprises a principal arc 54 with radius $r_{p4}$ which is tangential at F2 to the support straight line of the thread root. The support circle of arc 54 cuts the support straight line of stabbing flank 16 at $P_{RF4}$.

At $P_{RF4}$, the tangent 68 to the principal arc 24 makes a positive angle F with the stabbing flank 16. Angle F is 15°, for example.

Zone 52 also comprises a secondary arc 56 with radius $r_{S4}$ one end of which is tangential to the end of principal arc 54 and the other end of which is tangential to stabbing flank 16.

The radius $r_{p4}$ of the principal arc 54 is thus higher than the radius $r_{H4}$ of a standard circle with a not drawn tangent at $P_{RF4}$ to the stabbing flank 16 and at F2 to the support straight line of the thread root and thus induces the anti-fatigue characteristics of the junction between the thread root and the load flank.

Radius $r_{S4}$ is lower than radius $r_{p4}$ and is preferably in the range 0.1 to 0.4 times $r_{p4}$.

In this way, the design of the threaded element aims to improve the fatigue behaviour of the whole thread root when the two flanks 14, 16 are subjected to cyclic loads but when the load flank is further stressed, which is generally the case with pipe strings operating alternately in compression or subjected to bending efforts.

Figure 10B:
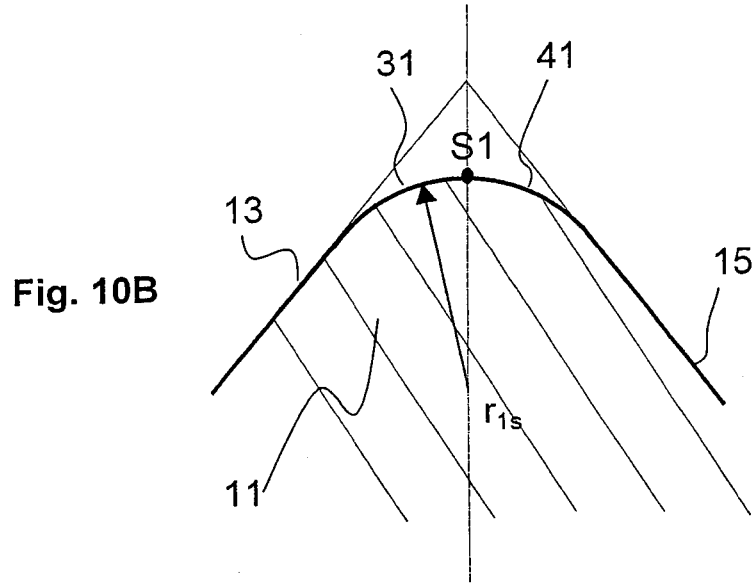
FIGS. 10B and 10C show the junction zones between the thread flanks of FIG. 10A.
Figure 10A:
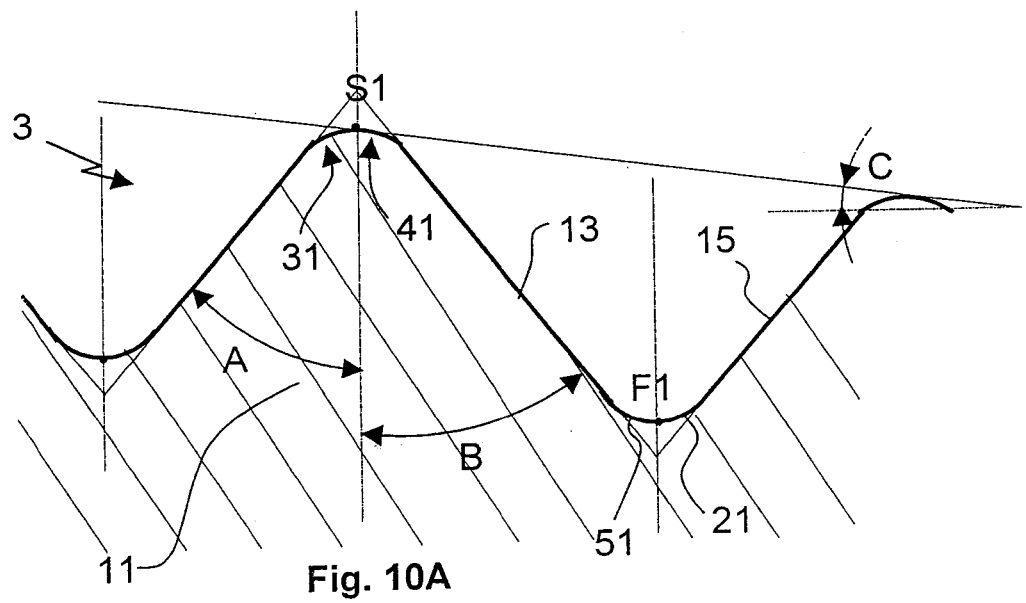
FIG. 10A shows a few triangular threads of a further variation of a male threaded element of the invention.

FIG. 10A shows a male thread 11 which can be screwed into the female thread 12 of FIG. 9A.

This male thread 11 comprises a thread crest S1, a thread root F1, a load flank 13 and a stabbing flank 15.

Flanks 13, 15 are joined to thread crests S1 and roots F1 by junction zones 21, 31, 41, 51.

Zones 31, 41 of the thread crest are shown in FIG. 10B and are constituted by an arc of a circle with radius $r_{1s}$ and are similar to 32, 42 shown in FIG. 9C.

Figure 10C:
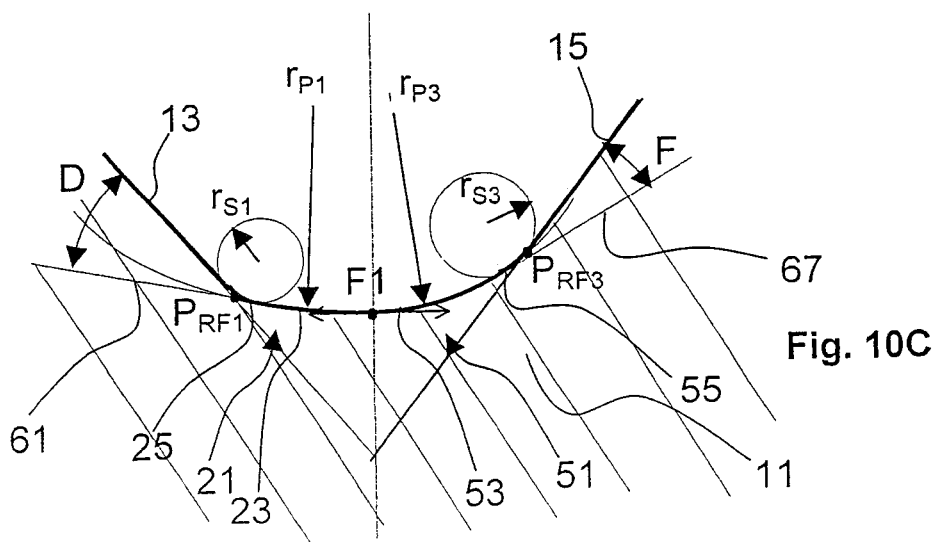

Thread root zones 21, 51 shown in FIG. 10C are multiple radius zones; they are similar to 22, 52 shown in FIG. 9B and match them.

Figure 11B:
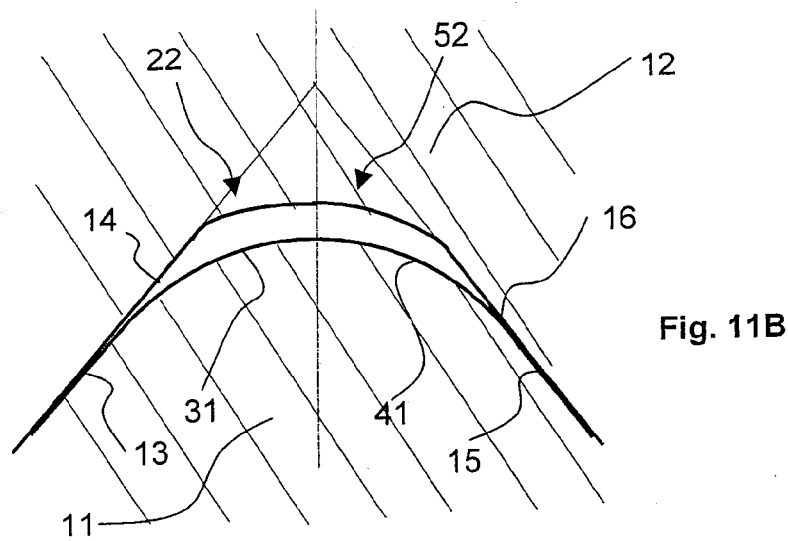
FIG. 11B shows a detail of the connection of FIG. 11A at the junction zones of FIGS. 9C and 10B.
Figure 11A:
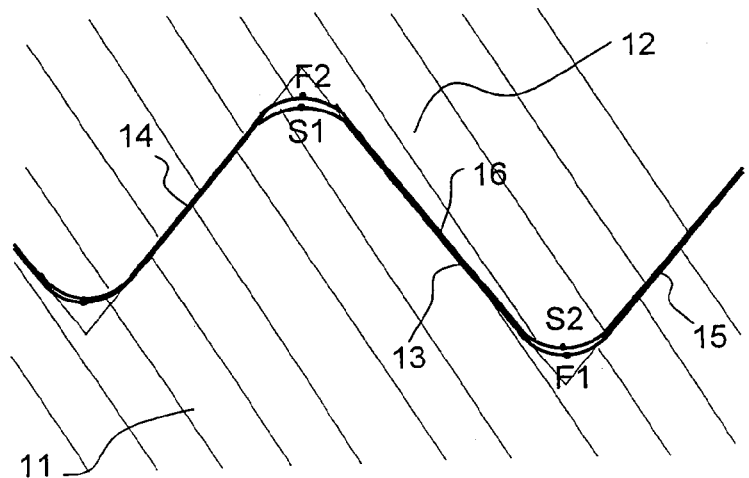
FIG. 11A shows a few threads of a further variation of a threaded connection of the invention constituted by connecting the threaded elements of FIGS. 9A and 10A.

FIG. 11A shows the male thread 11 of FIG. 10A and female thread 12 of FIG. 9A connected after screwing to constitute the threaded tubular connection of FIG. 1.

Threads 11, 12 are in contact under contact pressure by their two flanks: male load flank 13 is in contact with female load flank 14 and male stabbing flank 15 is in contact with female stabbing flank 16.

Figure 11C:
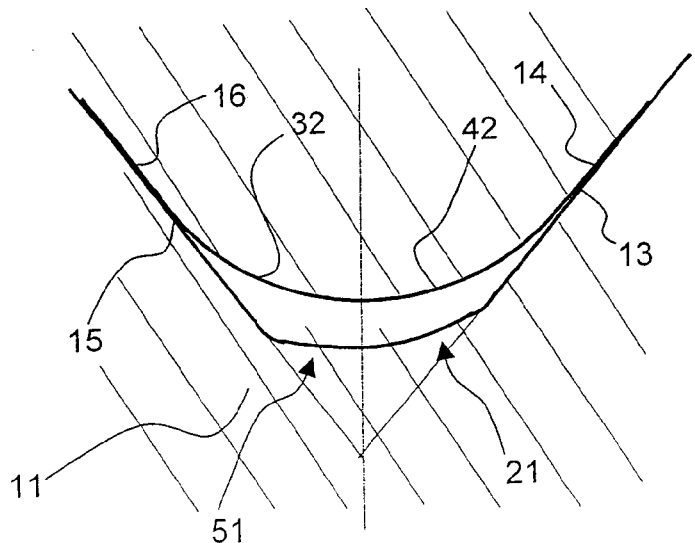
FIG. 11C shows a detail of the connection of FIG. 11A at the junction zones of FIGS. 9B and 10C.

In contrast, there is a clearance between the crests and roots of mated threads (F1/S2 and F2/S1) and between the corresponding junction zones (21/42, 51/32, 41/52, 31/22): see FIGS. 11B and 11C.

This clearance and the shape of the threads and the junction zones with large radius principal arcs at the thread root produce good tension-compression fatigue behaviour or bending behaviour of this type of threaded tubular connection with triangular threads.

Figure 12:
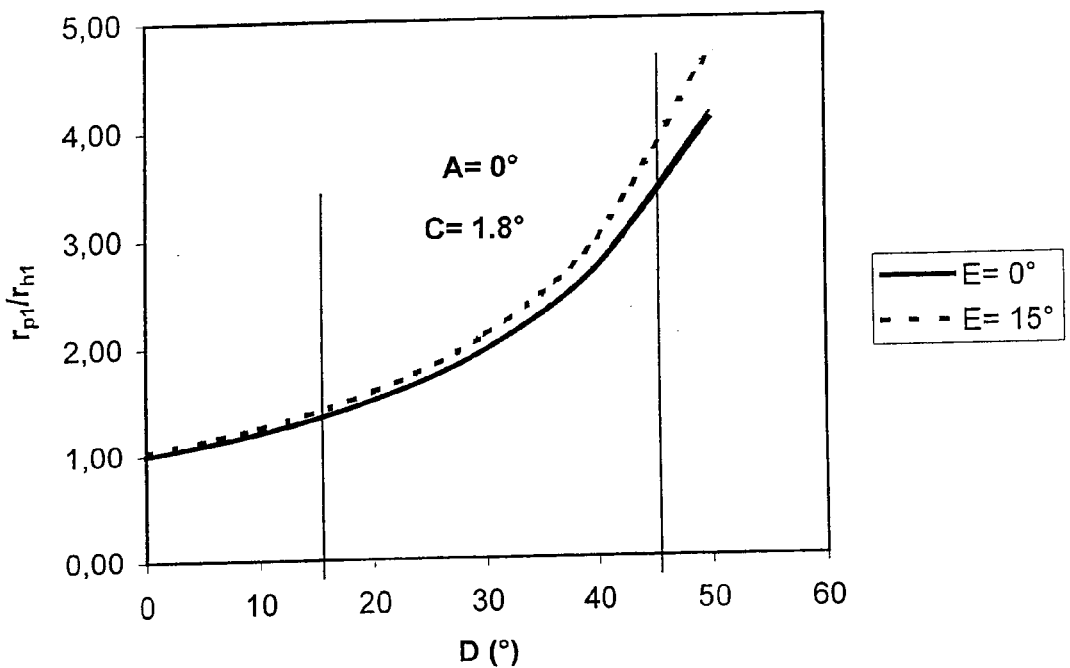
FIG. 12 is a graph showing the variation of the ratio of the radius of the principal arc to that of the standard circle of a junction zone as a function of the angle at the flank reference point for different values of the angle at the thread root junction point.
Figure 13:
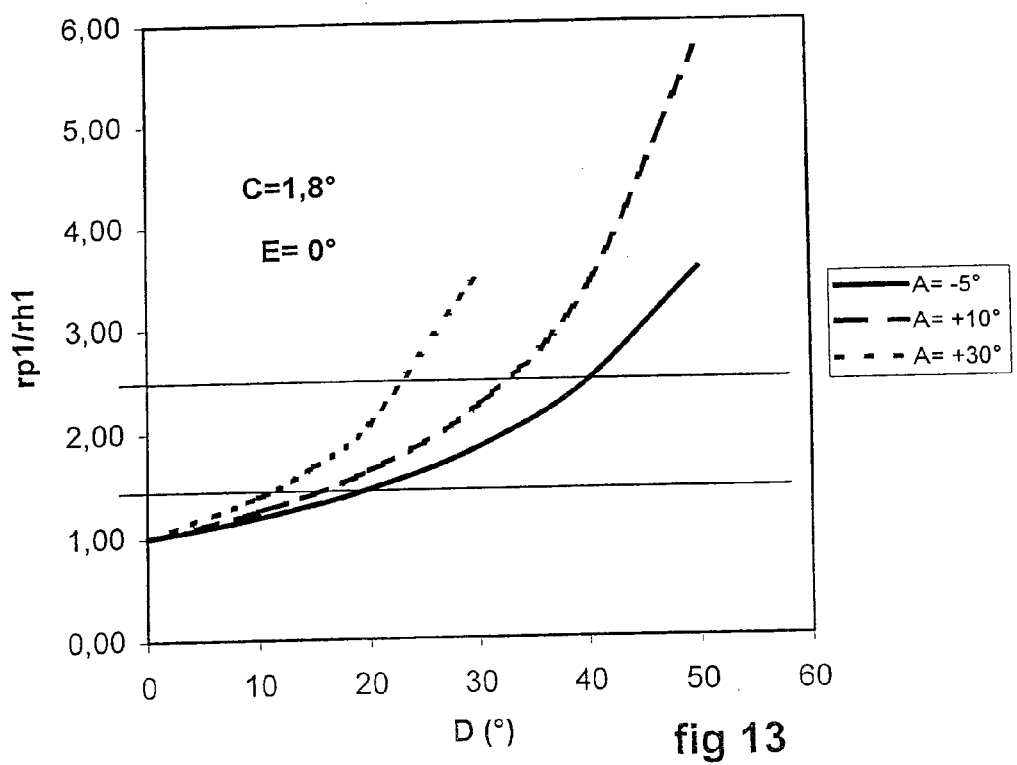
FIG. 13 shows the same graph for different values of the load flank angle.

FIGS. 12 and 13 illustrate the influence for different combinations of angles A and E of angle D on the value of the ratio $r_{P1}/r_{H1}$ of the radius of the principal arc of the multiple radius zone of the thread root to that of the standard arc constituting the tangential junction zone alone.

It appears from FIGS. 12 and 13 that the ratio $r_{P1}/r_{H1}$ increases with angle D. FIG. 12 shows that the influence of angle E is modest and is in agreement with the small variations tolerated for this angle: an angle E of 15° can produce slightly higher values for $r_{P1}/r_{H1}$ than when E=0°.

For the load flanks of trapezoidal threads which are generally not much inclined and correspond to (A–C) close to 0°, angle D can advantageously be selected in the range 15° to 45°, corresponding to the preferred range claimed for this angle when angle A is zero.

FIG. 13 shows the influence of angle A: the ratio $r_{P1}/r_{H1}$ increases when angle A increases algebraically.

A slightly negative angle A (load flanks overhanging the threads termed "hook threads") necessitates a relatively high angle D to obtain a substantial gain in $r_{P1}$.

A very positive angle A limits the value of angle D to 30°, or even 20°: such values for angle A are encountered with triangular threads.

The stabbing flanks of the trapezoidal threads are also generally more steeply inclined than the load flanks: the influence of angle B can be directly traced to that of angle A.

FIG. 14 shows the variation in the principal stress in the junction zone between the thread root and the load flank in the medial portion of the threading in the following configuration of a threaded connection for "risers" for the junction between the sea bed and the platform for offshore oilfield exploitation:

pipes with external diameters of 339.7 mm (13⅜") connected with threaded and coupled connections of the type shown in FIG. 1;

tapered threadings (⅙ taper, i.e., an angle C of 4.8°);

4 threads per inch (thread pitch 6.35 mm);

trapezoidal threads 2.1 mm high with crests and roots parallel to the pipe axis;

straight load flanks (A=0°);

inclined stabbing flanks (B=15°);

axial load under tension causing a tensile stress in the pipe bodies of 80% of the elastic limit of the material;

connections made up to abut with a standard makeup torque.

FIG. 14 compares the calculated value of the principal tensile stress on an elementary cube of material on the surface of a junction zone between the thread root and the load flank in the case of a standard junction with a single arc with a radius of 0.375 mm (STD curve) and with a multiple radius junction zone (RM curve).

The parameters of the multiple radius zone are:

D=30° E=0°

$R_{p1}$=0.64 mm $r_{s1}$=0.19 mm $r_{P1}/r_{s1}$=0.3

Position of point $P_{RF1}$ on load flank=0.32 mm from the support straight line of the thread root.

FIG. 14 shows an elementary cube of material on the surface of the junction zone at angular position θ and the value of the principal tensile stress σ on the face of the cube normal to the tangent to the surface of the junction zone as a function of the angular position θ; the position 0° corresponds to the end of the junction zone with the thread root and the position 90° to the other end of the zone on the load flank side.

A maximum in the principal stress C can be seen in the medial portion of the junction zone and in particular around the angular position 30°.

The use of a multiple radius junction zone can slightly reduce the position of the flank reference point to 0.32 mm against 0.375 mm for a standard junction and by about 20% of the maximum value of the principal stress σ.

Such a reduction causes a considerable gain in the number of cycles before fatigue rupture of the threaded connections.

The use of a ratio $r_{S1}/r_{P1}$ of 0.3 can limit the appearance of the secondary stress peak at the 70° position.

The present invention is not limited to the embodiments which have been described above.

The invention can in particular be applied to straight threadings (angle C=0) of the type shown at 303, 303', 304, 304' used in the threaded tubular connections 300 of FIG. 2.

It is also applicable to trapezoidal threads where the two flanks are in contact with or without contact pressure with the two flanks of the mated thread.

This is the case of threads known as rugged threads for threaded connections designed to operate under tension and compression such as those described in EP 0 454 147. In that document, the male and female load flanks are in contact under contact pressure and the male and female stabbing flanks are also in contact over a substantial proportion of the length of the threadings.

This is also the case with the axial interference fit flanks described in WO 00/14441.

This is also the case with wedge threads with variable width described in WO 94/29627.

The description of the triangular threads with the multiple radius thread root junction zone on each flank can be directly adapted to such trapezoidal threads, a trapezoidal thread simply being a triangular thread where the crests and roots have been truncated.

In the case of such trapezoidal threads, it is possible to use at the thread roots multiple radius zone junction zones with a principal arc radius which is different between the zone relating to the load flank and the zone relating to the stabbing flank.

Since this stabbing flank is generally less loaded than the load flank in trapezoidal threads where the two flanks are in contact with the corresponding flanks of the mated threaded element, the principal arc $r_p$ can advantageously be higher for the junction 21 and/or 22 of the load flank side than for that 51 and/or 52 on the stabbing flank side.

Alternatively, the principal radius $r_p$ can be identical for zones 21, 22, 51 and 52.

What is claimed is:

1. A male or female threaded tubular element for a threaded tubular connection formed at an end of a pipe and comprising an external male threading or an internal female threading depending on whether the threaded element is male or female in type, the threads of which, viewed in longitudinal cross-section passing through an axis of the threaded element, comprise a thread crest, a thread root, a rectilinear load flank, a rectilinear stabbing flank, and two tangential thread root junction zones, each of the two tangential thread root junction zones being disposed between the thread root and a corresponding one of the two flanks and comprising a plurality of arcs of a plurality of circles, wherein:

at least one of the two tangential thread root junction zones is a multiple radius zone;

one of the arcs of the multiple radius zone is a principal arc where a support circle cuts a support straight line of the corresponding flank at a flank reference point;

the at least one of the two tangential thread root junction zones includes a regular secondary curve on either side of the principal arc, which tangentially joins the multiple radius zone to the corresponding flank on one side and to the thread root on another side;

at the flank reference point, the tangent of the support circle of the principal arc makes an acute angle which is strictly positive with the support straight line of the corresponding flank;

said support circle of the principal arc cuts or is tangential to a support straight line of the thread root depending whether the secondary curve of the thread root either has a non-zero length or reduces to one point, respectively, the tangent to said support circle making an angle in the range −15° to +15° with the support straight line of the thread root at one of an intersection point and a tangent point of the support circle of the principal arc and the support straight line of the threat root; and "positive" is a term indicating that the principal arc does not cut into the corresponding flank.

2. A threaded tubular element according to claim 1, wherein:

at the flank reference point of the multiple radius zone under consideration, the angle between the tangent to the support circle of the principal arc and the corresponding flank is comprised between 10° and the difference (70°−J); and J is the algebraic angle between the corresponding flank and a normal to the axis of the threaded element.

3. A threaded tubular element according to claim 1, wherein:

at the flank reference point of the multiple radius zone under consideration, the angle between the tangent to the support circle of the principal arc and the corresponding flank is comprised between 15° and the difference (45°−J); and J is the algebraic angle between the corresponding flank and a normal to the axis of the threaded element.

4. A threaded tubular element according to claim 1, wherein the radius of the principal arc of the multiple radius zone includes between 150% and 250% of the radius of the standard arc passing through the flank reference point which would alone constitute a tangential junction zone between the corresponding flank and the thread root.

5. A threaded tubular element according to claim 1, wherein each secondary curve of the multiple radius zone that does not reduce to one point is an arc of a circle.

6. A threaded tubular element according to claim 5, wherein the ratio of the radius of the arc of each secondary curve to that of the principal arc of a multiple radius zone is in the range 0.1 to 0.4.

7. A threaded tubular element according to claim 1, wherein only the tangential junction zone of the thread root with the load flank is a multiple radius zone.

8. A threaded tubular element according to claim 1, wherein each of the two tangential junction zones is a multiple radius zone.

9. A threaded tubular element according to claim 8, wherein the radius of the principal arc of the multiple radius zone of the load flank is greater than or equal to the radius of the principal arc of the multiple radius zone of the stabbing flank.

10. A threaded tubular element according to claim 1, wherein the angle which each of the flanks makes with the normal to the axis of the threaded element is positive or zero.

11. A threaded tubular connection including at least one threaded tubular element of a first type according to claim 1, with a high resistance to static and dynamic stresses, comprising a male threaded tubular element at an end of a first pipe connected by screwing to a female threaded tubular element at an end of a second pipe by a male threading on the male threaded tubular element and a female threading on the female threaded tubular element wherein:

the threads of each of the male and female threadings include a thread crest, a thread root, a rectilinear load flank, a rectilinear stabbing flank, and four junction zones each comprising an arc of a circle, a first two of the four junction zones, the tangential thread root junction zones, each join the thread root to one flank; and a second two of the four junction zones, the thread crest junction zones, each join the thread crest to a flank; and a profile and disposition of each thread crest junction zone are adapted not to interfere with the tangential thread root junction zone of the mated threaded element.

12. A threaded tubular connection according to claim 11, wherein:

at least one thread crest junction zone of a threaded tubular element opposite a tangential thread root junction zone with multiple radii of a mated threaded tubular element with an anti-fatigue profile is a follower zone which comprises two arcs of two circles which join tangentially to each other, the two arcs include a principal and a secondary arc to produce the tangential thread crest junction of the corresponding flank, the tangent to said principal arc makes an acute angle which is strictly negative with the support straight line of the corresponding flank at a high junction point of the corresponding flank where the support circle of the principal arc of the follower zone cuts the support straight line of the corresponding flank.

13. A threaded tubular connection according to claim 11, wherein the two male and female elements of the threaded tubular connection are of the first type.

14. A threaded tubular connection according to claim 11, wherein the threadings are interference threadings, the thread crest of one threading radially interfering with the thread root of the mated threading.

15. A threaded tubular connection according to claim 11, wherein the two thread flanks of one threading are in contact with or without contact pressure with the two thread flanks of the mated threading over at least a portion of the length of the threadings.

* * * * *

UNITED STATES PATENT AND TRADEMARK OFFICE
CERTIFICATE OF CORRECTION

PATENT NO. : 6,729,658 B2
DATED : May 4, 2004
INVENTOR(S) : Lionel Verdillon

It is certified that error appears in the above-identified patent and that said Letters Patent is hereby corrected as shown below:

Column 9,
Line 18, change "respectively s screwed" to -- respectively screwed --.

Column 16,
Line 40, change "C" to -- σ --.

Signed and Sealed this

Second Day of November, 2004

JON W. DUDAS
*Director of the United States Patent and Trademark Office*